US012789604B2

(12) United States Patent
Nishiguchi et al.

(10) Patent No.: US 12,789,604 B2
(45) Date of Patent: Nov. 10, 2026

(54) UTILITY VEHICLE AND ROOF

(71) Applicant: KAWASAKI MOTORS, LTD., Akashi (JP)

(72) Inventors: Nobuyuki Nishiguchi, Akashi (JP); Norikazu Matsumura, Akashi (JP); Shogo Sakaguchi, Akashi (JP); Teruaki Yamamoto, Akashi (JP); Shuichi Miyanishi, Akashi (JP); Tokishin Nishinaka, Akashi (JP)

(73) Assignee: Kawasaki Motors, Ltd., Akashi (JP)

( * ) Notice: Subject to any disclaimer, the term of this patent is extended or adjusted under 35 U.S.C. 154(b) by 456 days.

(21) Appl. No.: 18/329,702

(22) Filed: Jun. 6, 2023

(65) Prior Publication Data

US 2024/0408948 A1 Dec. 12, 2024

(51) Int. Cl.
*B60J 7/16* (2006.01)
*B60J 7/02* (2006.01)

(52) U.S. Cl.
CPC ............ *B60J 7/1642* (2013.01); *B60J 7/022* (2013.01)

(58) Field of Classification Search
CPC ..... B60J 7/10; B60J 7/102; B60J 7/104; B60J 7/105; B60J 7/11
USPC ............................................ 296/218, 190.03
See application file for complete search history.

(56) References Cited

U.S. PATENT DOCUMENTS 2,795,458 A * 6/1957 Wieschel ........... B62D 33/0617 296/216.02
5,738,405 A * 4/1998 Richters ................. B62D 65/04 296/147
5,833,300 A * 11/1998 Russke .................... B60J 7/145 296/108
6,478,368 B1 * 11/2002 de Gaillard ............ B60J 7/1642 296/216.02
6,688,682 B2 * 2/2004 Arthur ................... B60J 7/1642 296/216.02
9,815,412 B1 * 11/2017 Tsumiyama ............. B60J 1/006
10,618,383 B2 * 4/2020 Luo .......................... B60J 1/025
2018/0186330 A1 7/2018 Tsumiyama et al.
2022/0063733 A1 * 3/2022 Collyer .................... B60J 7/106

FOREIGN PATENT DOCUMENTS

EP 3670222 A2 * 6/2020 ............ B60J 7/1607

OTHER PUBLICATIONS

EP3670222 Text (Year: 2020).*

* cited by examiner

*Primary Examiner* — Amy R Weisberg
(74) *Attorney, Agent, or Firm* — Muncy, Geissler, Olds & Lowe, P.C.

(57) ABSTRACT

A utility vehicle includes: a vehicle body that includes a rollover protective structure (ROPS) defining a riding space; and a roof that covers a top of the vehicle body. A state of the roof is changeable to a first state in which a top of a first region of the vehicle body is covered and a second state in which the top of the first region of the vehicle body during travel is opened.

10 Claims, 14 Drawing Sheets

UTILITY VEHICLE AND ROOF

BACKGROUND OF THE INVENTION

Field of the Invention

The present disclosure relates to utility vehicles and roofs.

Description of the Background Art

US 2018/0186330 A1 discloses a utility vehicle including a rollover protective structure (ROPS) that defines a riding space and a cargo bed that is located rearward of the ROPS.

SUMMARY

A utility vehicle includes: a vehicle body that includes a rollover protective structure (ROPS) defining a riding space; and a roof that covers a top of the vehicle body, wherein a state of the roof is changeable to a first state in which a top of a first region of the vehicle body is covered and a second state in which the top of the first region of the vehicle body during travel is opened.

According to the utility vehicle, the utility vehicle can travel with the roof being opened or closed as necessary.

These and other objects, features, aspects and advantages of the present disclosure will become more apparent from the following detailed description when taken in conjunction with the accompanying drawings.

DESCRIPTION OF THE PREFERRED EMBODIMENTS

Embodiment

Figure 1:
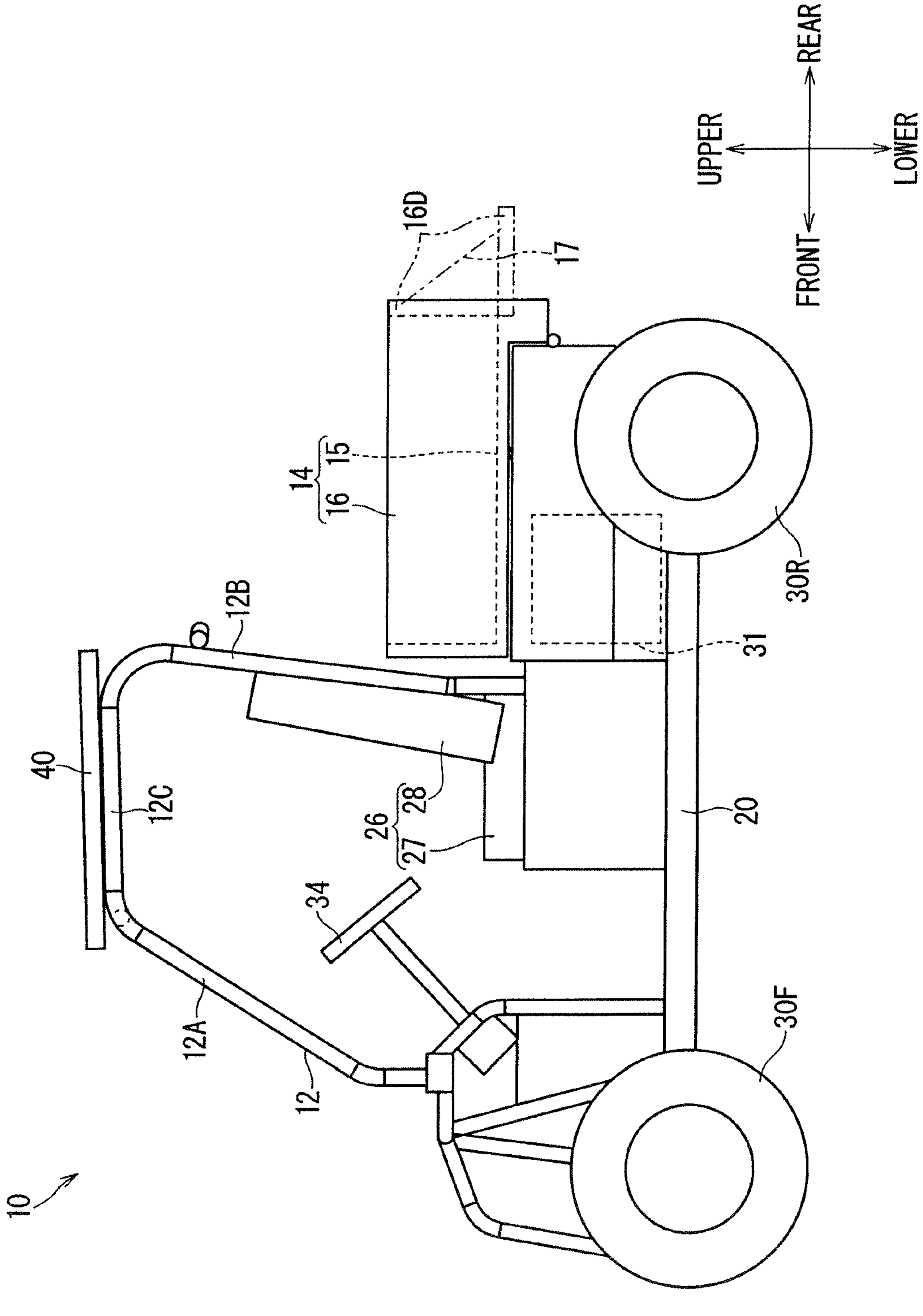
FIG. 1 is a side view illustrating a utility vehicle.

A utility vehicle according to an embodiment will be described below. FIG. 1 is a side view illustrating a utility vehicle 10. In description made below, a direction of travel of the utility vehicle 10 is also referred to as a forward direction, a direction opposite the forward direction is also referred to as a rearward direction, a direction toward a road surface on which the utility vehicle 10 travels is also referred to as a downward direction, and a direction opposite the downward direction is also referred to as an upward direction. Left and right are sometimes referred to in a state of facing forward while standing on the road surface. A left-right direction is a vehicle width direction.

Overall Configuration of Utility Vehicle

The utility vehicle 10 includes a rollover protective structure (ROPS) 12, a chassis 20, and a roof 40. In the present embodiment, the utility vehicle 10 further includes a cargo bed 14, a seat 26, a travel mechanism, and a driving operation mechanism.

The ROPS 12 defines a riding space. In an example illustrated in FIG. 1, the ROPS 12 includes vertical frames 12A, vertical frames 12B, and horizontal frames 12C. The vertical frames 12A and the vertical frames 12B are away from each other in a front-rear direction. The seat 26, a steering wheel 34, and the like are located between the vertical frames 12A and the vertical frames 12B in the front-rear direction. The horizontal frames 12C connect upper ends of the vertical frames 12A and the vertical frames 12B. The vertical frames 12A, the vertical frames 12B, and the horizontal frames 12C are provided on left and right sides to form a pair. The seat 26, the steering wheel 34, and the like are located between the frames 12A, 12B, and 12C forming the pair in the left-right direction. The ROPS 12 may include a cross frame that connects the frames 12A, 12B, and 12C provided on the left and right sides to form a pair.

The cargo bed 14 is located rearward of the ROPS 12. In the example illustrated in FIG. 1, the cargo bed 14 includes a mount 15 and a peripheral wall 16 that surrounds a periphery of the mount 15. A wall as a portion of the peripheral wall 16 may be openable and closable around an axis extending along an outer edge of the mount 15 at the bottom of the wall. A rear wall 16D indicated by alternate long and two short dashes lines in FIG. 1 is an example of the wall openable and closable around an axis along the left-right direction at the bottom of the rear wall 16D. In this case, a rear wall support 17 that supports the opening rear wall 16D in a horizontal orientation may be provided to the cargo bed 14 as illustrated in FIG. 1.

The chassis 20 supports the cargo bed 14. Parts (e.g., the seat 26, the ROPS 12, a travel motor 31, and wheels 30F and 30R) of the utility vehicle 10 other than the cargo bed 14 are also supported by the chassis 20.

The seat 26 includes a seat cushion 27 an occupant (a driver and a passenger) is seated on and a seat back 28 the occupant leans against. The seat back 28 has a height enabling support of the back of the occupant seated on the seat 26. In the example illustrated in FIG. 1, only one seat 26 in the front-rear direction is provided. Two seats 26 and three or more seats 26 may be provided separately in the front-rear direction.

The travel mechanism is a mechanism for travel of the utility vehicle 10 and includes the wheels 30F and 30R, the travel motor 31, and a power transmission mechanism. Rotational driving force of the travel motor 31 is transmitted to the wheels 30F and 30R via the power transmission mechanism to cause the utility vehicle 10 to travel. An example in which the utility vehicle 10 includes four wheels

30F and 30R is described in the present embodiment. The utility vehicle 10 may include three wheels and may include six wheels. The power transmission mechanism may have any configuration, and the power transmission mechanism may include a transmission and a drive shaft, for example.

The wheels 30F and 30R include front wheels 30F and rear wheels 30R. Two front wheels 30F are supported to be rotatable around a central axis thereof and to be rotatable around a steering axis on left and right sides of the front of the chassis 20. Two rear wheels 30R are supported to be rotatable around a central axis thereof on left and right sides of the rear of the chassis 20.

The travel motor 31 may be an electric motor that converts electric energy into rotational motion for travel. In this case, the utility vehicle 10 includes a travel battery that supplies electric energy to the travel motor 31. The travel motor 31 may be an internal combustion engine that combusts fuel in a combustion chamber and expands gas by combustion to generate power for travel. In this case, the utility vehicle 10 is required to include a fuel tank. The travel motor 31 may be provided at any position. For example, the travel motor 31 is supported at the bottom of the cargo bed 14.

The driving operation mechanism is a mechanism to receive driving operation of the driver and includes the steering wheel 34 and an unillustrated pedal, for example. The driver can rotate the front wheels 30F around the steering axis by operating the steering wheel 34. The driver can perform accelerator operation and brake operation by operating the pedal. The steering wheel 34 and the pedal are located forward of the seat 26. The driver seated on the seat 26 can operate the steering wheel 34 and the pedal. For example, the steering wheel 34 protrudes rearward of lower ends of the vertical frames 12A. The pedal is located below the steering wheel 34. The pedal may include an accelerator pedal and a brake pedal provided separately, or a single pedal may be provided so that both an accelerator and a brake are operable.

The roof 40 covers the top of a vehicle body. The roof 40 is installed for waterproofing, shading, and occupant protection purposes, for example. A region of the vehicle body covered with the roof 40 is a region including a first region. A range of the first region is not particularly limited and can be set as appropriate. For example, the first region may include a portion of the vehicle body forming the riding space. The first region may include a portion in which the seat 26 is provided. The first region may include a region of the cargo bed 14 of the vehicle body, for example.

The roof 40 is attached to the ROPS 12. How to attach the roof 40 to the ROPS 12 is not particularly limited and can be set as appropriate. The roof 40 may be removably attached to the ROPS 12 and may be irremovably attached to the ROPS 12.

A member forming the roof 40 is not particularly limited and can be set as appropriate. For example, the roof 40 may be formed of an easily-deformed soft member, such as cloth. Alternatively, the roof 40 may be formed of a difficult-to-deform rigid body, such as a metal plate and a resin plate having high stiffness, for example. The roof 40 may be a composite roof obtained by combining the easily-deformed soft member and the difficult-to-deform rigid body, for example. The roof 40 may be formed of a waterproof member, for example. The roof 40 may be formed of a transparent member that allows light to pass therethrough and may be formed of an opaque member that does not allow light to pass therethrough, for example.

The state of the roof 40 is changeable to a first state in which the top of the first region of the vehicle body is covered and a second state in which the top of the first region of the vehicle body during travel is opened. In the present disclosure, the utility vehicle 10 during travel refers to a state of having a vehicle speed or a state of the wheels 30F and 30R being rotated. The state of the roof 40 may be changed during stopping of the vehicle and may be changed during travel of the vehicle. The utility vehicle 10 is only required to be able to travel in each of the first state and the second state.

The state of the roof 40 may be changeable between the first state and the second state during travel of the utility vehicle 10. The state of the roof 40 may be changeable by operation of the occupant present in the riding space. In this case, the utility vehicle 10 may include an operator operated by the occupant. The operator may be a switch. In this case, the utility vehicle 10 includes an actuator that moves the roof 40 in conjunction with the switch. The operator may be a held part held by the occupant. In this case, the occupant manually moves a movable roof part. The operator is preferably located at a position accessible from the occupant seated on a driver seat.

The state of the roof 40 may be changed by a part of the roof 40 covering the top of the first region being moved to a position offset from the top of the first region while a state of the roof 40 being attached to the ROPS 12 is maintained. In this case, the part of the roof 40 covering the top of the first region is a movable part. The state may be changed by attachment and removal of the roof 40 to and from the ROPS 12. In this case, an attachment to attach the roof 40 to the ROPS 12 is a removably attachable attachment.

The roof 40 may include roof parts that cover different regions. The roof parts are removably attachable independently of one another or relatively movable. In this case, the roof parts include at least one roof part that can open the top of a region that the roof part is responsible for by attachment and removal or movement.

Only one of the roof parts may be able to open the top of a region that the roof part is responsible for by attachment and removal or movement. In this case, the one roof part is a first roof part. The first roof part is a removably attachable or movable roof part whose state is changeable. A roof part other than the first roof part is a second roof part. The second roof part is a roof part whose state is unchangeable in contrast to the first roof part. A region that the first roof part is responsible for is the first region, and a region that the second roof part is responsible for is a second region.

Two or more of the roof parts may be able to open the top of regions that the roof parts are responsible for by attachment and removal or movement. In this case, any one of the two or more roof parts is the first roof part, and a roof part other than the first roof part is the second roof part. A region that the first roof part is responsible for is the first region, and a region that the second roof part is responsible for is the second region. The first roof part is a removably attachable or movable roof part whose state is changeable also in this case. The second roof part includes a removably attachable or movable roof part whose state is changeable similarly to the first roof part. In a case where two or more second roof parts are provided, a fixed roof part may be provided separately from the removably attachable or movable roof part.

The roof 40 may include a single roof part that covers the top of the first region. In this case, the state is changed between the first state and the second state by the single roof 40 as a whole being integrally attached and removed or moved.

ROPS, Seat, and Roof

Figure 2:
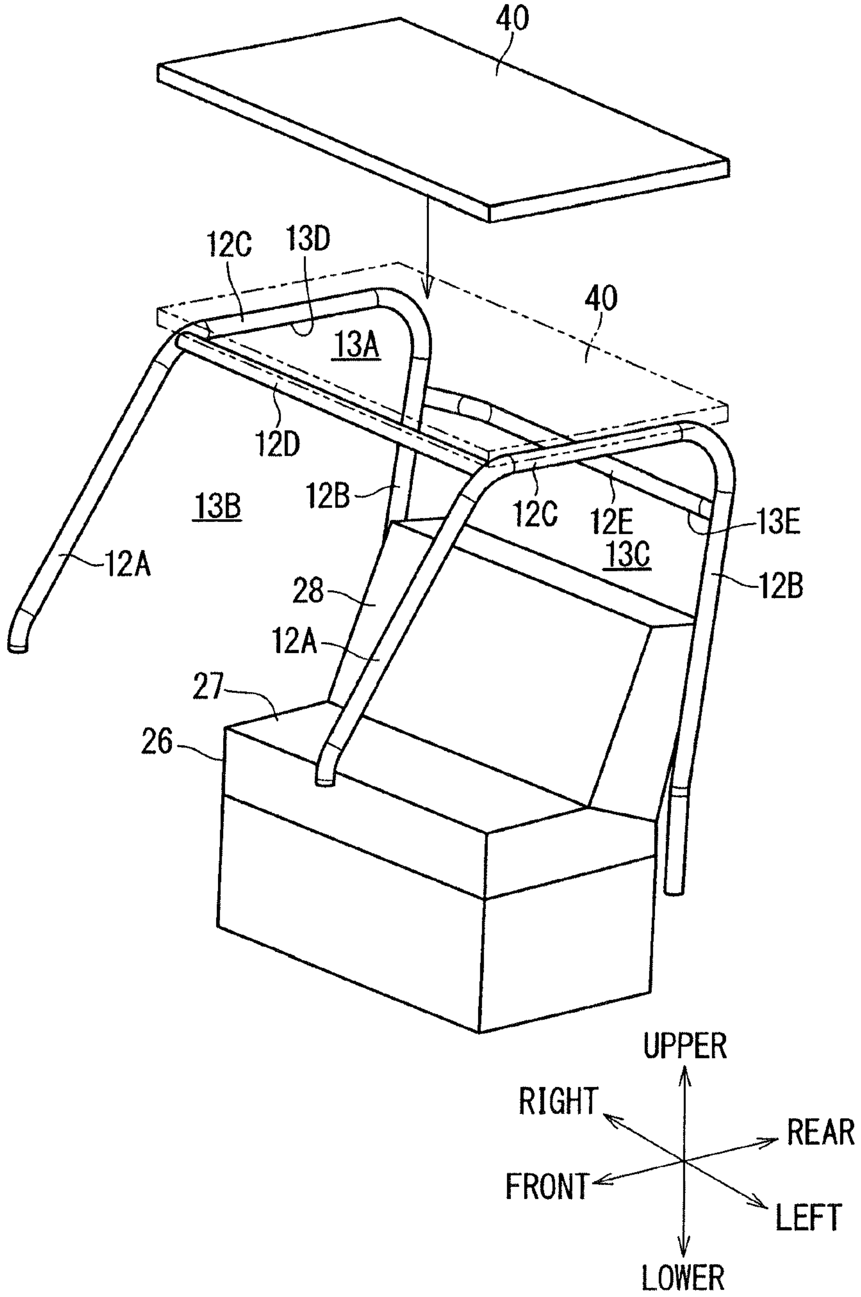
FIG. 2 is a perspective view illustrating a ROPS, a seat, and a roof.

FIG. 2 is a perspective view illustrating the ROPS 12, the seat 26, and the roof 40.

In an example illustrated in FIG. 2, the ROPS 12 further includes cross frames 12D and 12E in addition to the above-mentioned frames 12A, 12B, and 12C. The cross frames 12D and 12E extend in the left-right direction. The cross frames 12D and 12E connect the frames 12A, 12B, and 12C on a left side and the frames 12A, 12B, and 12C on a right side. The cross frames 12D and 12E are arranged away from each other in the front-rear direction. The cross frame 12D is connected to junctions between the vertical frames 12A and the horizontal frames 12C. The cross frame 12E is connected to upper ends of the vertical frames 12B. The cross frames 12D and 12E are located above the seat 26. The cross frame 12D is located above the cross frame 12E. The cross frame 12D may be located below the cross frame 12E, and the cross frame 12D may be located on the same level as the cross frame 12E.

There are openings between the frames 12A, 12B, 12C, 12D, and 12E of the ROPS 12. In the example illustrated in FIG. 2, five openings, that is, a top opening 13A, a front opening 13B, a left opening 13C, a right opening 13D, and a rear opening 13E are formed by the frames 12A, 12B, 12C, 12D, and 12E.

The top opening 13A is an opening surrounded by tops of the vertical frames 12B provided on the left and right sides to form a pair, the horizontal frames 12C provided on the left and right sides to form a pair, and the two cross frames 12D and 12E. The top opening 13A is located above the seat 26.

The front opening 13B is an opening surrounded by the vertical frames 12A provided on the left and right sides to form a pair and the cross frame 12D. The front opening 13B is located forward of the seat 26. The front opening 13B is an opening for the driver to view forward.

The left opening 13C is an opening surrounded by vertical frames 12A and 12B and a horizontal frame 12C on a left side. The left opening 13C is located on a left side of the seat 26.

The right opening 13D is an opening surrounded by vertical frames 12A and 12B and a horizontal frame 12C on a right side. The right opening 13D is located on a right side of the seat 26. The left opening 13C and the right opening 13D are openings for entry and exit of the occupant to and from the utility vehicle 10. The left opening 13C and the right opening 13D are typically bilaterally symmetric.

The rear opening 13E is an opening surrounded by bottoms of the vertical frames 12B provided on the left and right sides to form a pair and the cross frame 12E. The rear opening 13E is located rearward of the seat 26. The top of the rear opening 13E is located above the seat back 28.

The roof 40 that covers the top of the riding space is provided to block all or part of the top opening 13A. A range of the opening 13A blocked by the roof 40 is not particularly limited and can be set as appropriate. In the example illustrated in FIG. 2, the roof 40 blocks all of the top of the opening 13A. A rear part of the opening 13A is not blocked so that there is a gap between the roof 40 and the cross frame 12E. The roof 40 may block the rear part of the opening 13A.

In the example illustrated in FIG. 2, the roof 40 is removably attachable to the ROPS 12. That is to say, the roof 40 is retrofittable to the ROPS 12 and is removable from the ROPS 12 in a state of being attached to the ROPS 12. The first state is a state in which the roof 40 is attached to the ROPS 12, and the second state is a state in which the roof 40 is removed from the ROPS 12. The roof 40 includes only one roof part. It is contemplated that the roof 40 is attached and removed during stopping of the vehicle. The state of the roof 40 is unchangeable during travel of the vehicle and is changeable only during stopping of the vehicle.

In the example illustrated in FIG. 2, openings of the ROPS 12 other than the top opening 13A are not blocked in the utility vehicle 10. The openings other than the top opening 13A may be blocked by a cover and the like as appropriate. The cover may include at least one selected from the group consisting of a front cover that covers the front of the riding space, a rear cover that covers the rear of the riding space, a left side cover that covers a left side of the riding space, and a right side cover that covers a right side of the riding space.

The front cover blocks the front opening 13B. The front cover is also referred to as a windshield. The left side cover blocks the left opening 13C. The right side cover blocks the right opening 13D. A part of the left side cover that blocks the bottom of the left opening 13C and a part of the right side cover that blocks the bottom of the right opening 13D can be considered as doors. The utility vehicle 10 may be able to normally travel with the left opening 13C or the right opening 13D being open without being completely blocked by a door and the like. The rear cover blocks the rear opening 13E.

The cover may be provided separately from the roof 40 and may be provided integrally with the roof 40.

Removably Attachable Attachment

Figure 3:
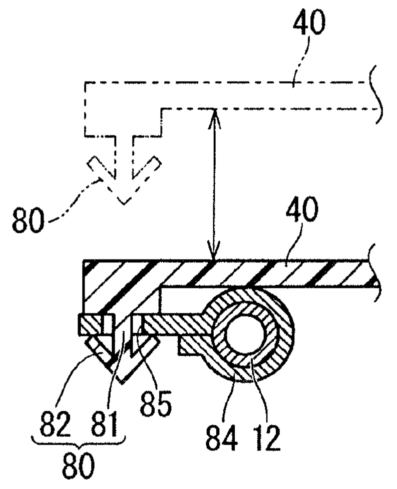
FIG. 3 is a cross-sectional view illustrating an attachment that enables removable attachment of the roof to the ROPS.

FIG. 3 is a cross-sectional view illustrating an attachment 80 that enables removable attachment of the roof 40 to the ROPS 12.

In an example illustrated in FIG. 3, the attachment 80 provided to the roof 40 is removably attached to an attachment receiver 84 provided to the ROPS 12.

The attachment 80 is in the form of a clip including a column 81 protruding from the roof 40 and a barb 82 provided to a leading end of the column 81. An attachment hole 85 is formed in the attachment receiver 84. The attachment 80 is inserted into the attachment hole 85 and engaged. The attachment receiver 84 may be in the form of a clip, and the attachment hole 85 may be formed in the attachment 80. The attachment and the attachment receiver may be male and female snap fasteners. The attachment and the attachment receiver may be a fastening structure using a fastening member, such as a bolt and a rivet.

The roof 40 including the attachment 80 is the roof 40 for the utility vehicle 10 that includes the ROPS 12 and is one example of the roof 40 that includes a roof main body that covers the top or the rear of the riding space and the attachment 80 that is removably attached to the ROPS 12. The roof 40 that covers the top or the rear of the riding space is thus easily retrofittable to the utility vehicle 10 that includes the ROPS 12.

Opening and Closing of Roof

Figure 4:
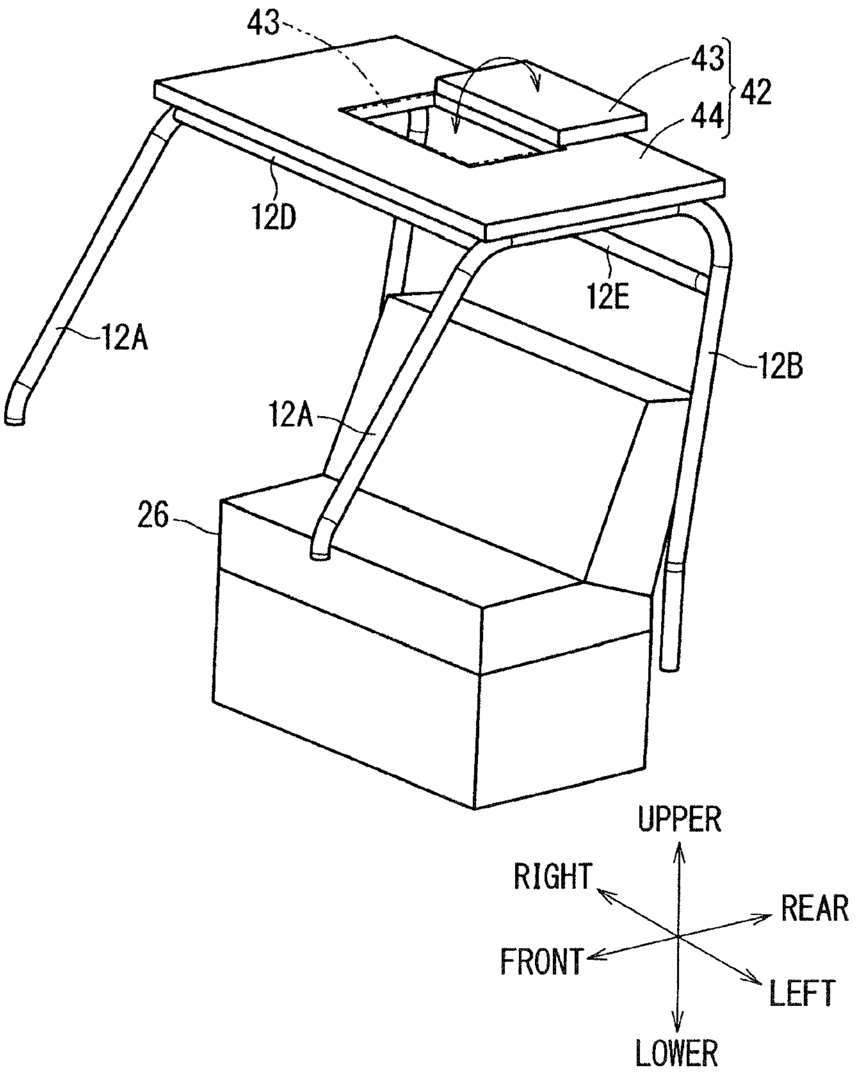
FIG. 4 is a perspective view illustrating the roof being opened and closed.

FIG. 4 is a perspective view illustrating a roof 42 being opened and closed.

The state of the roof 42 illustrated in FIG. 4 is changeable between the first state and the second state by moving the roof 42 with the roof 42 being attached to the ROPS 12. The roof 42 covers the top opening 13A. At least a portion of the roof 42 is openable and closable. The roof 42 includes roof parts 43 and 44. The roof 42 is an integrated roof that includes the roof parts 43 and 44 provided integrally. The roof parts 43 and 44 include a movable roof part 43 that is movable in a state of being attached to the ROPS 12. In an example illustrated in FIG. 4, the movable roof part 43 is a hinged roof 45 that is rotatably supported via a hinge. The first state is a state in which the hinged roof 45 is located above the first region. The second state is a state in which the hinged roof 45 is located at a position offset from the first region. The hinged roof 45 may cover the top of a region next to the first region in the second state. The hinged roof 45 may be a vertical wall along a vertical direction in the second state.

The roof parts 43 and 44 include a fixed roof part 44 that is immovable in a state of being attached to the ROPS 12. The fixed roof part 44 is attached to the ROPS 12. An opening is formed in the fixed roof part 44. The opening of the fixed roof part 44 allows an outside and an inside of the vehicle body to communicate. The movable roof part 43 is supported to be openable and closable by the fixed roof part 44 via the hinge. The movable roof part 43 blocks the opening of the fixed roof part 44 in a closed state to be in the first state. The movable roof part 43 opens the opening of the fixed roof part 44 in an opened state to be in the second state. The movable roof part 43 may overlap the fixed roof part 44 in the second state.

The ROPS 12 includes a top part that covers the roof 42. The top part includes tops of the vertical frames 12A and 12B, the horizontal frames 12C, the cross frames 12D and 12E, and the like of the ROPS 12.

Roof and Cover

Figure 5:
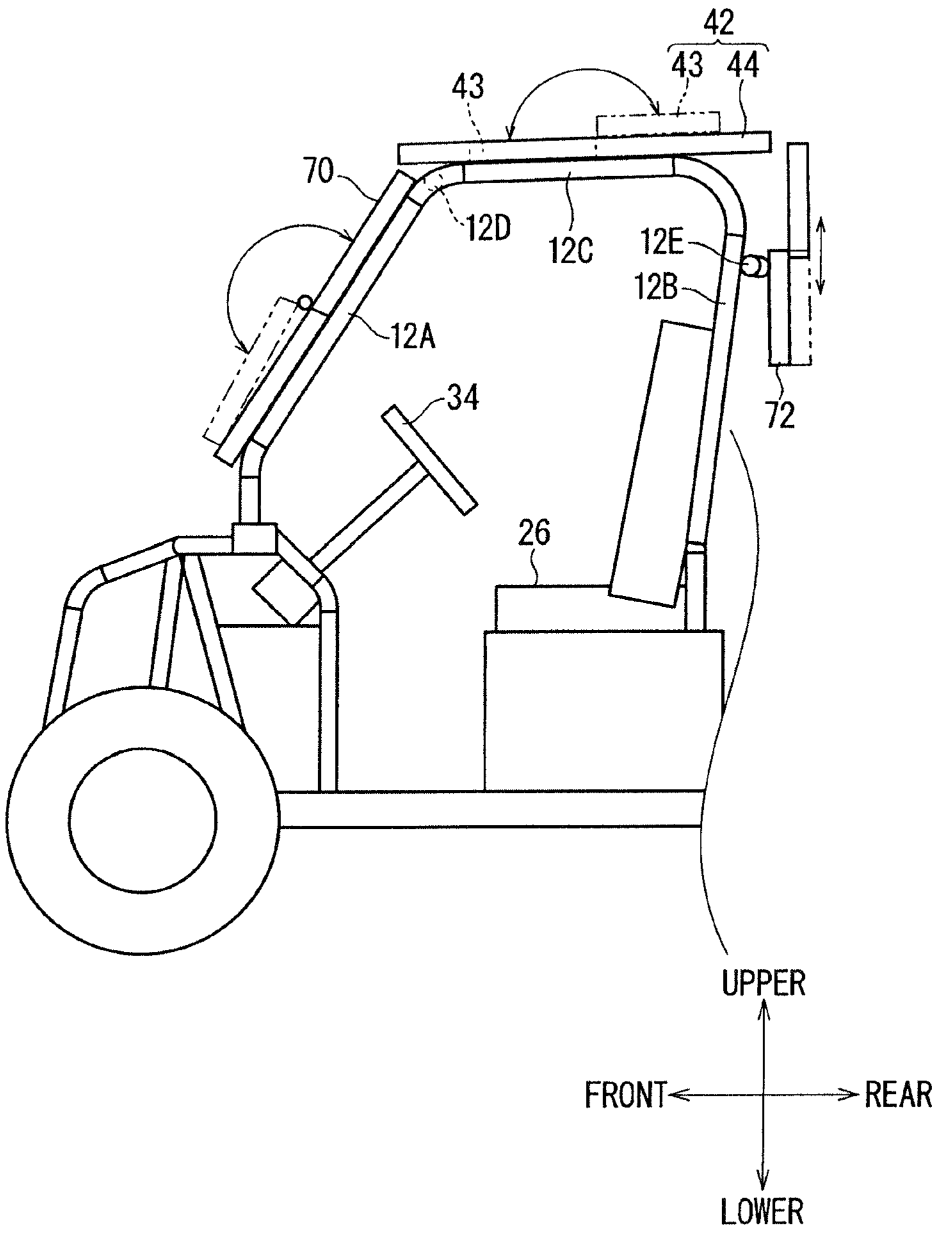
FIG. 5 is a side view illustrating the roof and covers being opened and closed.

FIG. 5 is a side view illustrating the roof 42 and covers 70 and 72 being opened and closed.

In an example illustrated in FIG. 5, the utility vehicle 10 includes a front cover 70 that covers the front of the riding space so that the front is openable and closable. The utility vehicle 10 also includes a rear cover 72 that covers the rear of the riding space so that the rear is openable and closable. The top of the riding space is covered with the roof 42 to be openable and closable.

The front cover 70 blocks the front opening 13B so that front opening 13B is openable and closable. The rear cover 72 blocks the rear opening 13E so that the rear opening 13E is openable and closable. The roof 42 blocks the top opening 13A so that the top opening 13A is openable and closable. The roof 42, the front cover 70, and the rear cover 72 are provided separately from one another. The roof 42, the front cover 70, and the rear cover 72 may integrally be provided.

Figure 6:
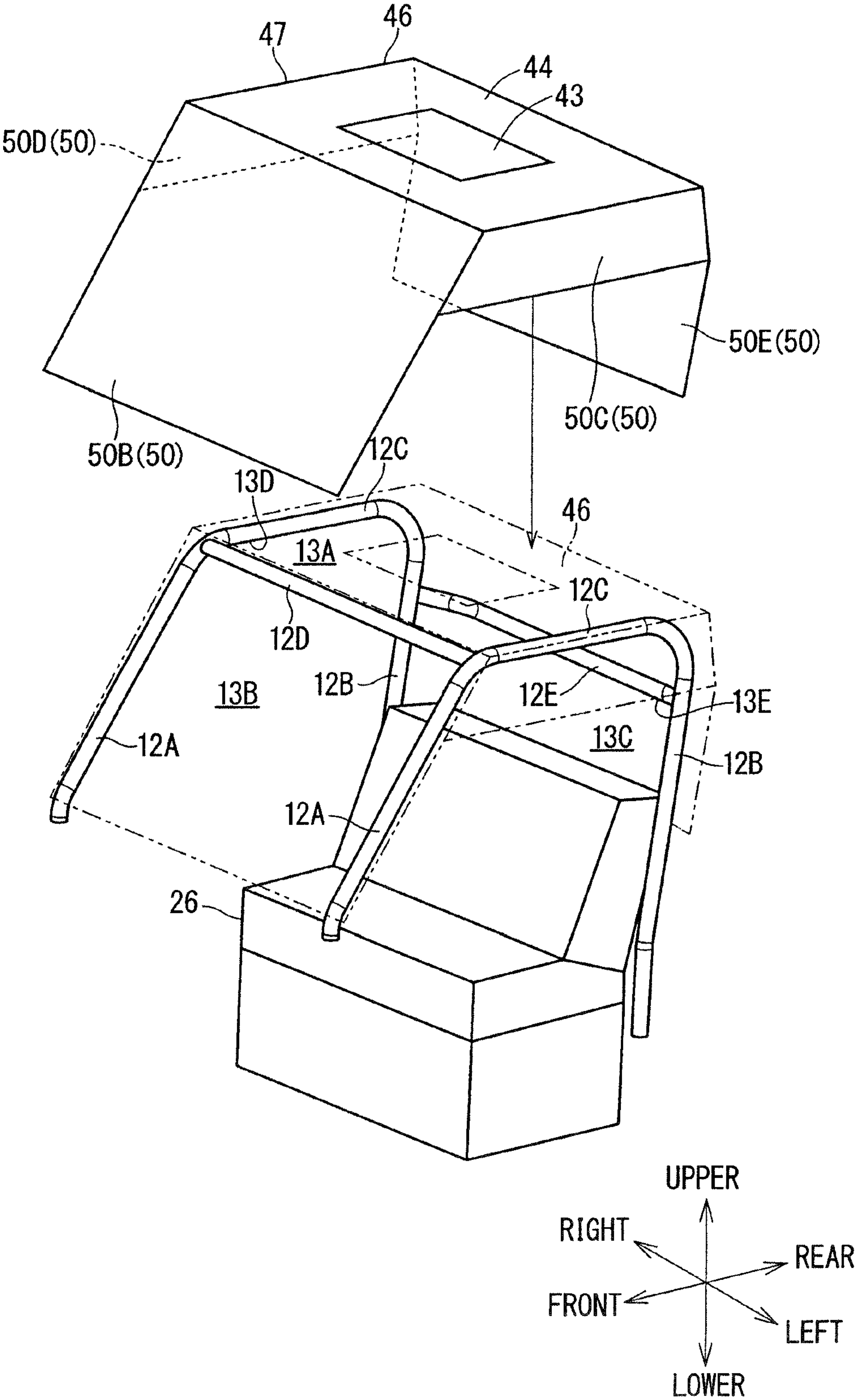
FIG. 6 is a perspective view illustrating an integrated roof.

FIG. 6 is a perspective view illustrating an integrated roof 46.

The roof and the cover are integrally provided to form the integrated roof 46. The integrated roof 46 includes a roof 47 and a cover 50. In an example illustrated in FIG. 6, the roof 47 includes the hinged roof part 43 and the fixed roof part 44 similarly to the above-mentioned roof 42. The roof may have a different configuration from the roof 42.

The cover 50 includes a front cover 50B, a left side cover 50C, a right side cover 50D, and a rear cover 50E. One or more of the front cover 50B, the left side cover 50C, the right side cover 50D, and the rear cover 50E may be omitted. The roof 47 may be removable from the ROPS 12 separately from the front cover 50B, the left side cover 50C, the right side cover 50D, and the rear cover 50E. The roof 47 may be removable from the ROPS 12 with the front cover 50B, the left side cover 50C, the right side cover 50D, and the rear cover 50E being attached to the ROPS 12.

In the example illustrated in FIG. 6, the front cover 50B and the rear cover 50E entirely block the front opening 13B and the rear opening 13E, respectively. The left side cover 50C and the right side cover 50D partially block the top of the left opening 13C and the top of the right opening 13D, respectively. A range of the openings of the ROPS 12 blocked by the front cover 50B, the left side cover 50C, the right side cover 50D, and the rear cover 50E can be set as appropriate.

Sliding Roof

Figure 7:
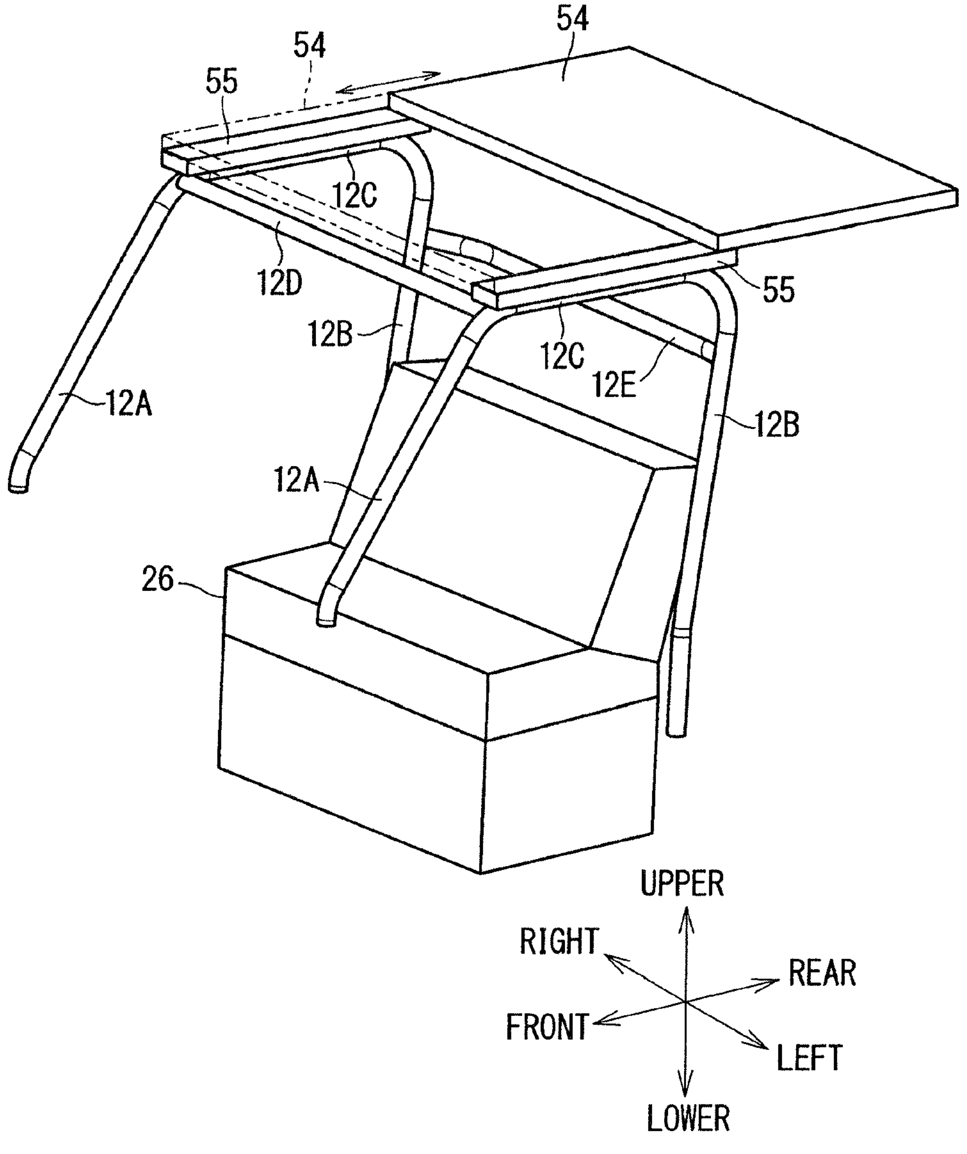
FIG. 7 is a perspective view illustrating a roof being opened and closed.

FIG. 7 is a perspective view illustrating a sliding roof 54 being opened and closed.

As illustrated in FIG. 7, the roof may include the sliding roof 54 that is supported slidably. In an example illustrated in FIG. 7, the sliding roof 54 includes only the movable roof part. The first state is a state in which the sliding roof 54 is located above the first region. The second state is a state in which the sliding roof 54 is located at a position offset from the top of the first region. The sliding roof 54 may cover the top of a region different from the first region in the second state.

In the example illustrated in FIG. 7, the sliding roof 54 is slid to change the state thereof to a state in which the top of the riding space is covered and a state in which the top of a region rearward of the riding space (a region of the cargo bed 14) is covered.

The utility vehicle 10 includes a sliding assist member 55 that is attached to the ROPS 12 and slidably supports the sliding roof 54. The sliding assist member 55 is rails 55, for example. The rails 55 are along the ROPS 12. The rails 55 extend along the horizontal frames 12C of the ROPS 12. The rails 55 may not be along the ROPS 12.

The sliding roof 54 may be slid in any sliding direction. In the example illustrated in FIG. 7, the sliding direction is the front-rear direction. The sliding direction may be the left-right direction. The sliding direction may be a horizontal direction that crosses each of the front-rear direction and the left-right direction. In the example illustrated in FIG. 7, the sliding direction is along a single straight line. The sliding direction may be along a curve. For example, the sliding direction may be along the horizontal frames 12C and the vertical frames 12B.

In the example illustrated in FIG. 7, the sliding roof 54 includes only one roof part being slid. The sliding roof 54 may include roof parts being slid to overlap each other.

Figure 8:
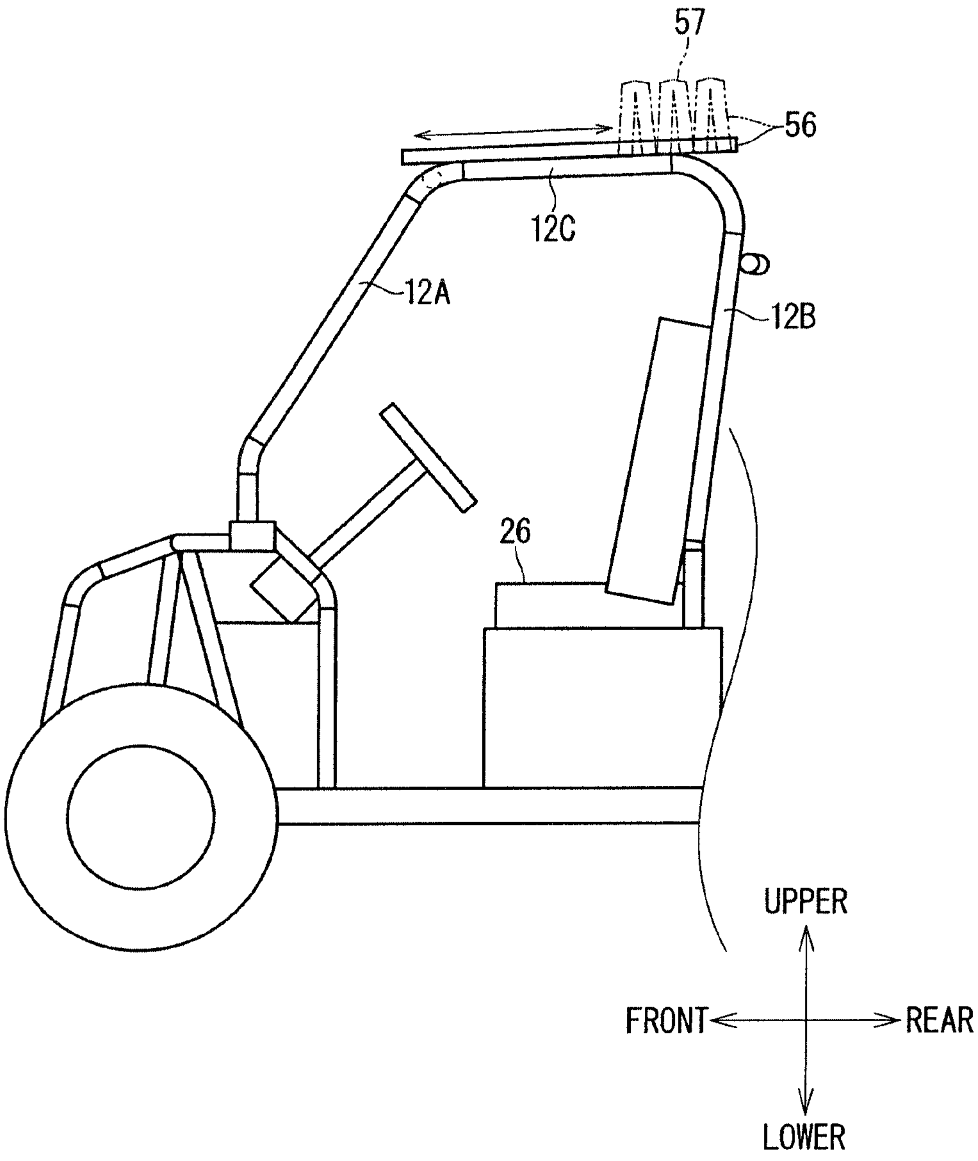
FIG. 8 is a side view illustrating a first modification of a sliding roof.

FIG. 8 is a side view illustrating a first modification of the sliding roof 54.

In an example illustrated in FIG. 8, an accordion roof 56 is provided as the sliding roof. The state of the accordion roof 56 is changeable between a state indicated by an alternate long and two short dashes line and a state indicated by a solid line in FIG. 8. The state indicated by the alternate long and two short dashes line in FIG. 8 is a folded state of the accordion roof 56 in which a bellows 57 is formed. The folded state is the second state. The state indicated by the solid line in FIG. 8 is an unfolded state of the accordion roof 56 in which the bellows 57 is eliminated. The unfolded state is the first state.

Figure 9:
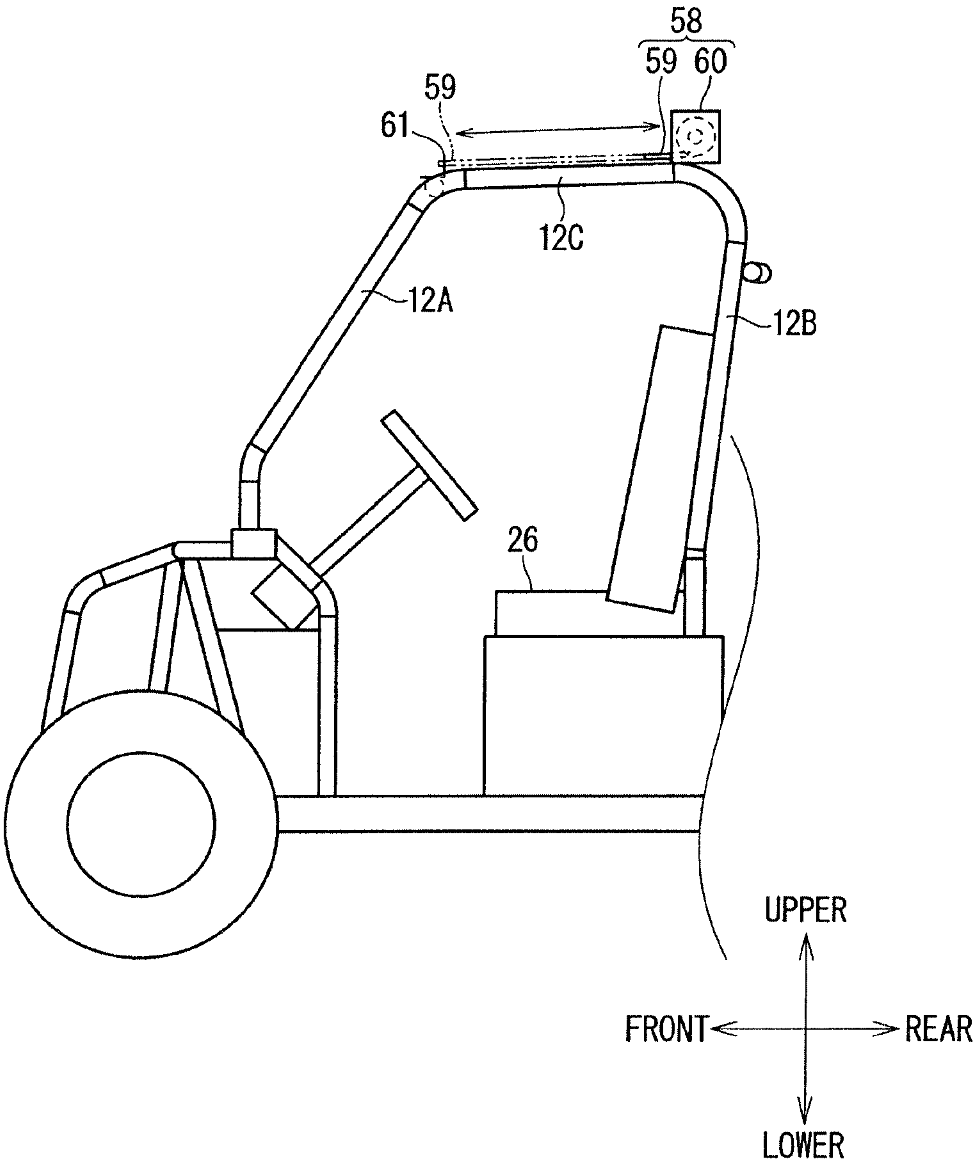
FIG. 9 is a side view illustrating a second modification of the sliding roof.

FIG. 9 is a side view illustrating a second modification of the sliding roof 54.

In an example illustrated in FIG. 9, a roller shade roof 58 is provided as the sliding roof. The roller shade roof 58 includes a shade 59, a wind-up device 60, and a hook 61. The shade 59 is wound and received by the wind-up device 60, and a leading end thereof protrudes from the wind-up device 60 as indicated by a solid line in FIG. 9. The wound state is the second state. The shade 59 is extendable from the wind-up device 60 as indicated by an alternate long and two short dashes line in FIG. 9. The extended state is the first state. The hook 61 catches the leading end of the extended shade 59 and holds the shade 59 in the extended state.

In the example illustrated in FIG. 9, the wind-up device 60 is provided at the rear, and the hook 61 is provided at the front. The wind-up device 60 may be provided at the front, and the hook 61 may be provided at the rear. The wind-up device 60 and the hook 61 may be provided away from each other in the left-right direction.

A cover that is slid similarly to the sliding roof 54 illustrated in FIG. 7, the accordion roof 56 illustrated in FIG. 8, or the roller shade roof 58 illustrated in FIG. 9 may be provided to cover at least one of the openings 13B, 13C, 13D and 13E other than the top opening 13A.

Fixed Roof, Sliding Roof, and Cover

Figure 10:
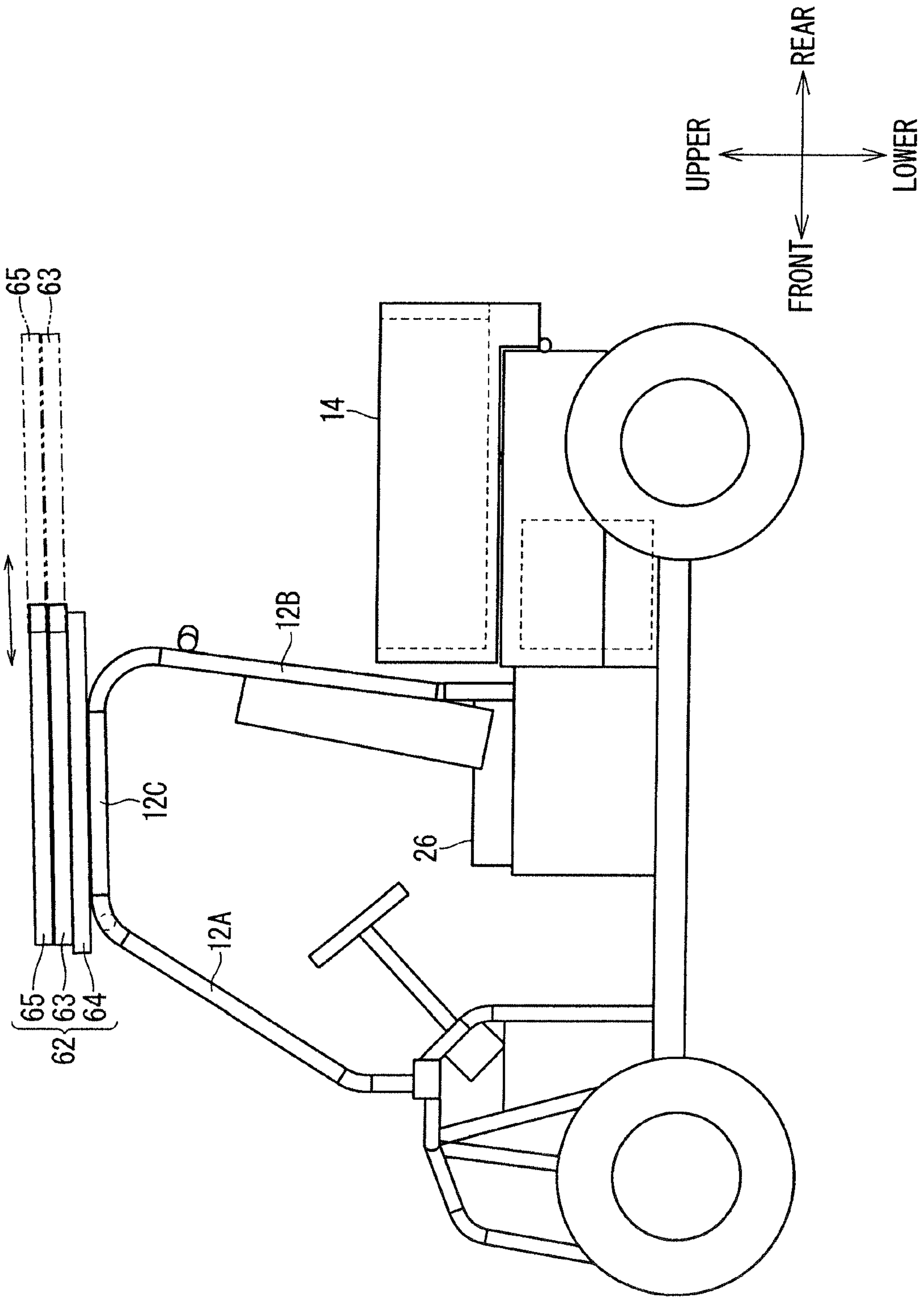
FIG. 10 is a side view illustrating a roof with a cover being opened and closed.
Figure 11:
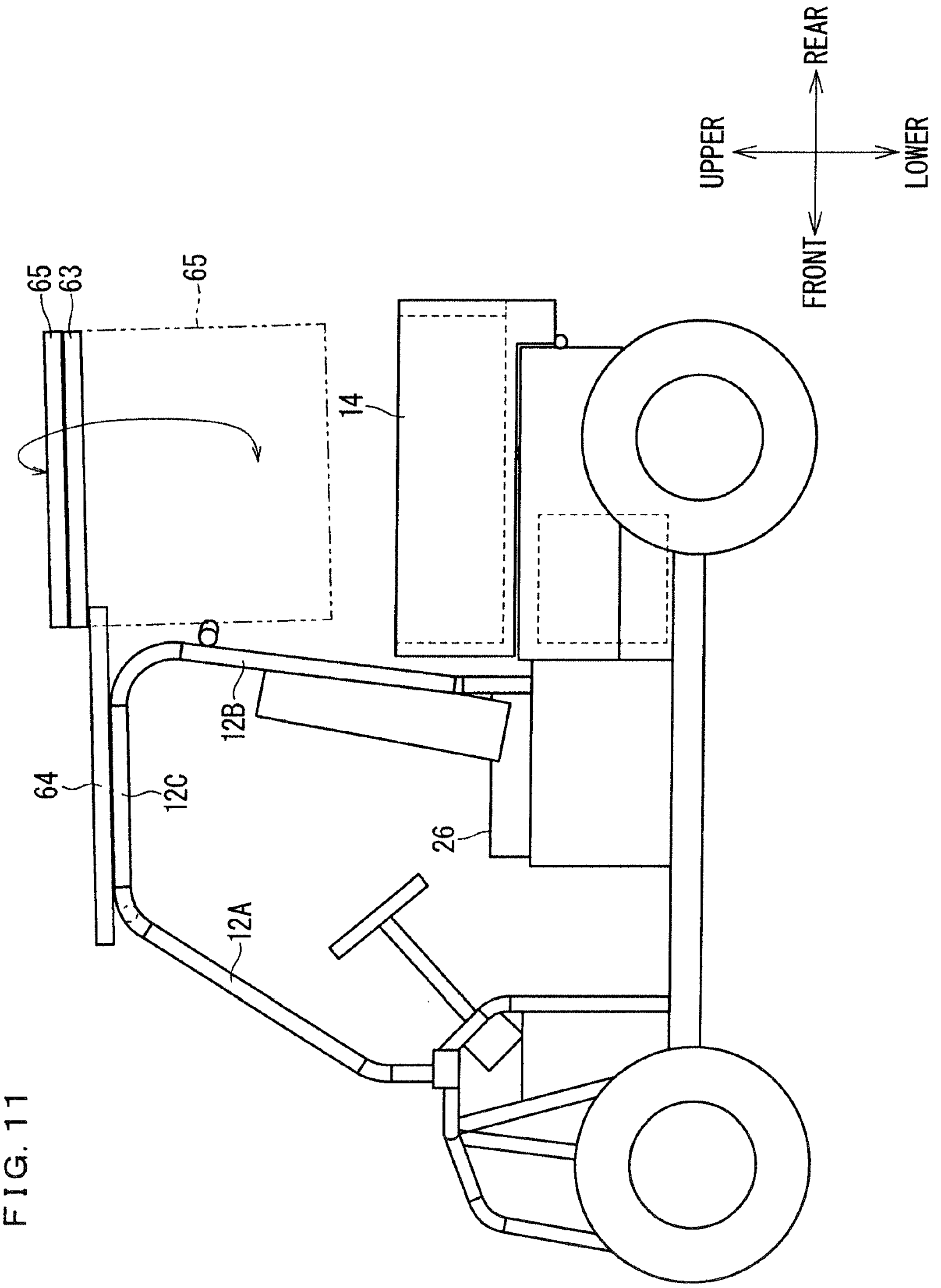
FIG. 11 is a side view illustrating the cover being opened and closed.
Figure 12:
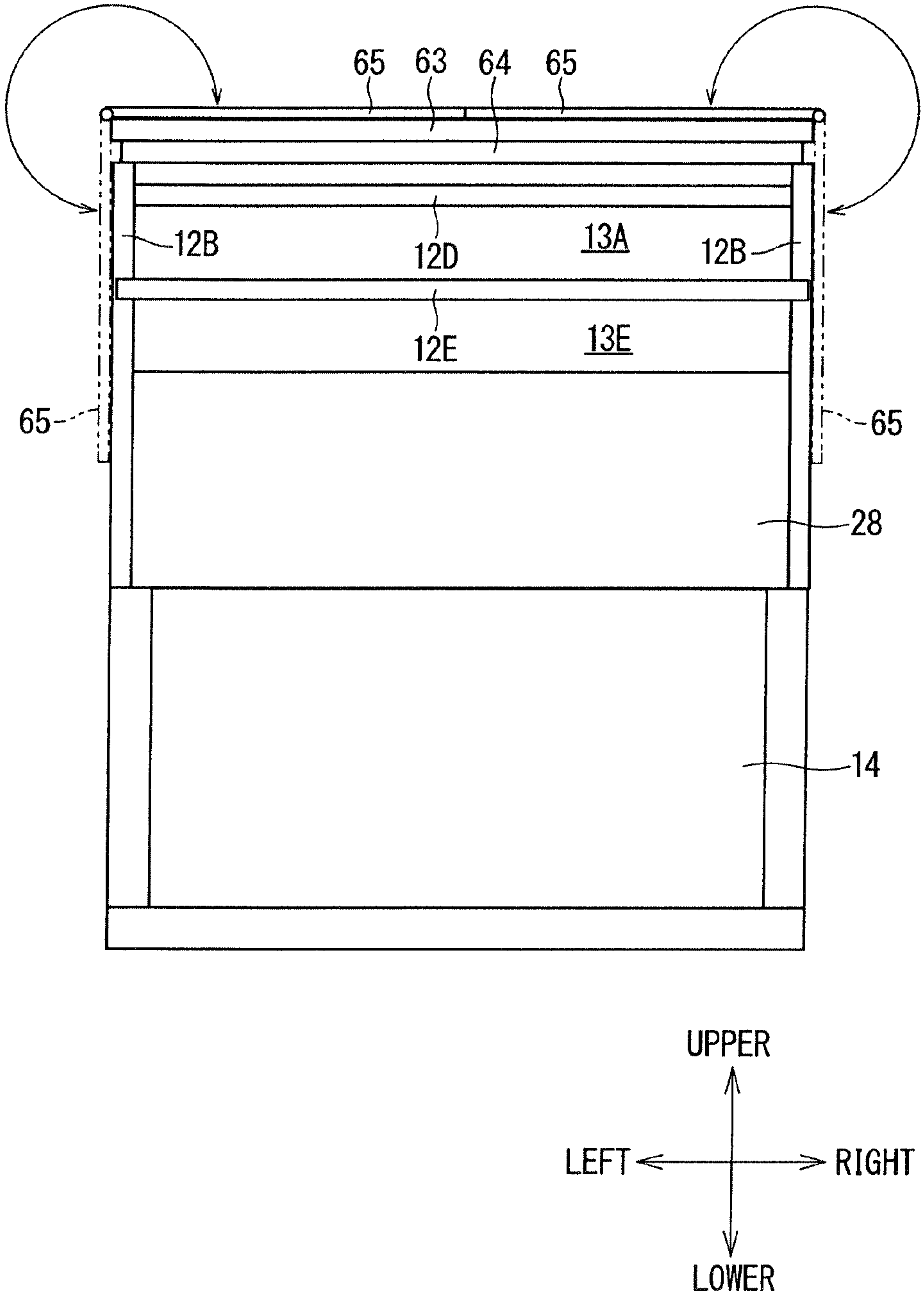
FIG. 12 is a rear view illustrating the cover being opened and closed.

FIG. 10 is a side view illustrating a roof with a cover 62 being opened and closed. FIG. 11 is a side view illustrating a cover part 65 being opened and closed. FIG. 12 is a rear view illustrating the cover part 65 being opened and closed.

The roof with the cover 62 includes a sliding roof part 63, a fixed roof part 64, and the cover part 65. The state of the sliding roof part 63 is changed to the first state and the second state. The fixed roof part 64 covers the top of the second region of the vehicle body. At least a portion of the sliding roof part 63 overlaps the fixed roof part 64 in the second state.

The first region covered with the sliding roof part 63 is a region of the cargo bed 14. The sliding roof part 63 covers the top of the cargo bed 14. The second region covered with the fixed roof part 64 is a region of the ROPS 12. The fixed roof part 64 covers the top of the riding space. Thus, in an example illustrated in FIG. 10, the sliding roof part 63 is slid so that the top of the cargo bed 14 is openable and closable. The first region may be the region of the ROPS 12, and the second region may be the region of the cargo bed 14.

The cover part 65 is attached to the sliding roof part 63 to be expandable and receivable. The cover part 65 is received by the sliding roof part 63 and can be slid together with the sliding roof part 63. The cover part 65 may overlap the fixed roof part 64 together with the sliding roof part 63 when the sliding roof part 63 is in the second state. The cover part 65 is expandable into the first region when the sliding roof part 63 is in the first state.

In an example illustrated in FIG. 11, the cover part 65 is expanded to be a vertical cover for the cargo bed 14. The cover part 65 may be expanded and received by any scheme. The scheme to expand and receive the cover part 65 may be a sliding scheme and a hinge-rotary scheme. The cover part 65 may be a soft sheet 26 and may be rounded and turned back to be folded and received and extended to be expanded.

In the example illustrated in FIG. 11, flap covers 65 that flap around axes along the front-rear direction are provided as the cover part 65. The flap covers 65 cover the sides of the cargo bed 14 in a state of being expanded into the first region. The flap covers 65 are rotatably supported by a left edge and a right edge of the sliding roof part 63. In the example illustrated in FIG. 11, two flap covers 65 do not overlap each other in the vertical direction. The two flap covers 65 overlap different portions of the sliding roof part 63 in the vertical direction. The two flap covers 65 may overlap each other in the vertical direction. The flap covers 65 overlap the sliding roof part 63. The flap covers 65 may underlie the sliding roof part 63.

A flap cover that is supported to be rotatable around an axis along the vehicle width direction may be provided as a flap cover 65. The flap cover covers the front or the rear of the cargo bed 14 in a state of being expanded into the first region.

Dumper

Figure 13:
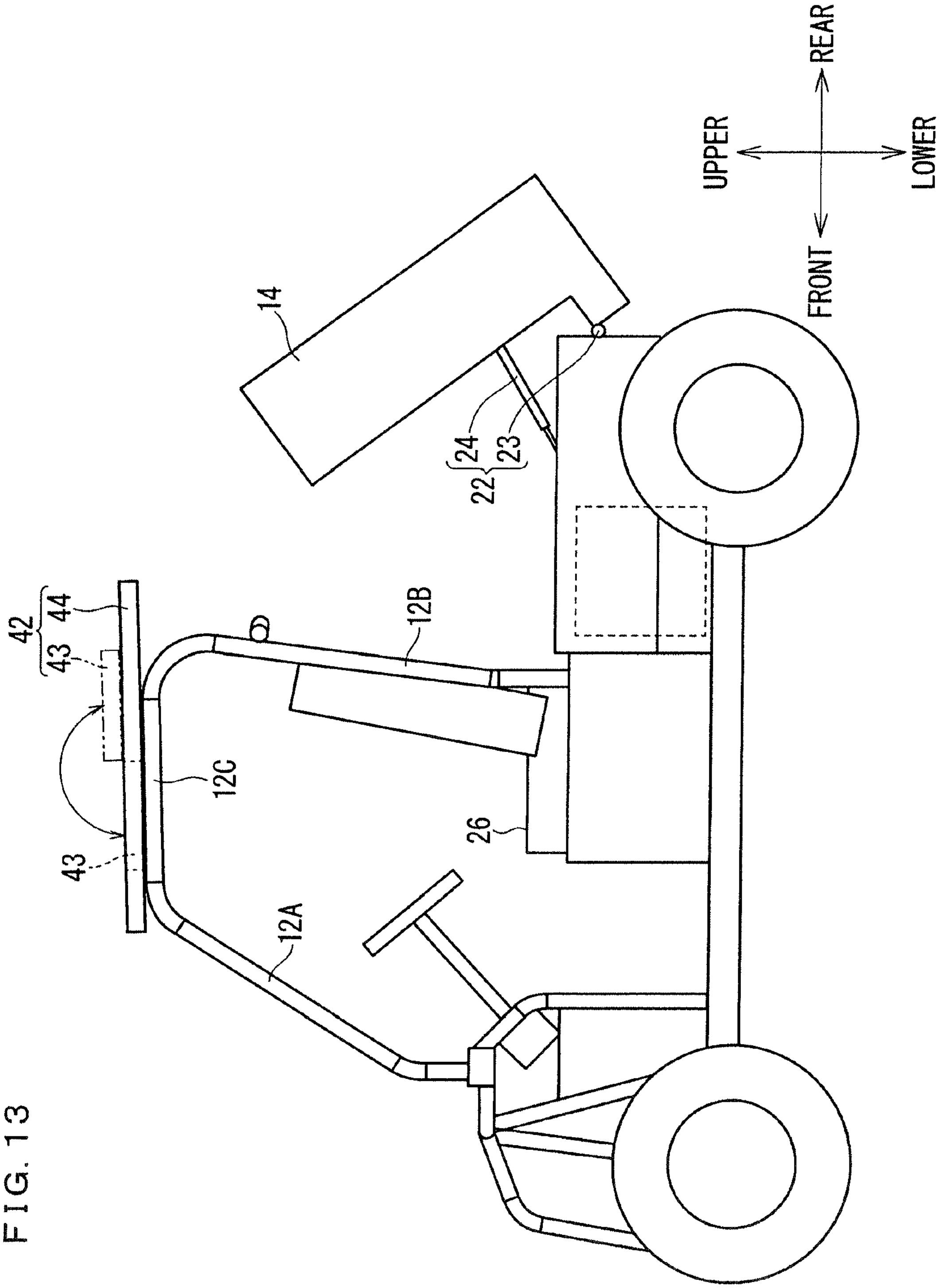
FIG. 13 is a side view illustrating a utility vehicle dumping a cargo bed.

FIG. 13 is a side view illustrating the utility vehicle 10 dumping the cargo bed 14.

The utility vehicle 10 illustrated in FIG. 13 have a configuration in which the cargo bed 14 can be tilted. The utility vehicle 10 includes a dumper 22 to tilt the cargo bed 14. The dumper 22 can tilt the cargo bed 14 relative to the chassis 20. The dumper 22 includes a rotational shaft 23 that supports the cargo bed 14 so that the cargo bed 14 is rotatable relative to the chassis 20 and a cylinder 24 that imparts torque around the rotational shaft 23 to the cargo bed 14 at a position away from the rotational shaft 23. The rotational shaft 23 is provided at the bottom of the rear of the cargo bed 14. The cylinder 24 expands and contracts vertically. An upper end of the cylinder 24 is attached to the front of the cargo bed 14. The cylinder 24 lifts the front of the cargo bed 14. The cylinder 24 may be a power-operated cylinder and may be an air cylinder.

In a case where the utility vehicle 10 includes the dumper 22, the cargo bed 14 is required not to interfere with a not-tilted vehicle body (e.g., the ROPS 12 and the roof 40) when the cargo bed 14 is tilted. For example, the not-tilted vehicle body (e.g., the ROPS 12 and the roof 40) may be provided not to be located on a rotational trajectory of the cargo bed 14 in advance. In a case where the not-tilted vehicle body (e.g., the ROPS 12 and the roof 40) are located on the rotational trajectory of the cargo bed 14, a portion of the not-tilted vehicle body located on the rotational trajectory of the cargo bed 14 may be formed to be retractable when the cargo bed 14 is tilted.

A mechanism to change the state of the roof 40 to the first state and the second state may be independent of the dumper 22. For example, the mechanism may be provided so that the state of the roof 40 is not changed when a switch to drive the cylinder 24 to perform dumping action is operated.

Link

Figure 14:
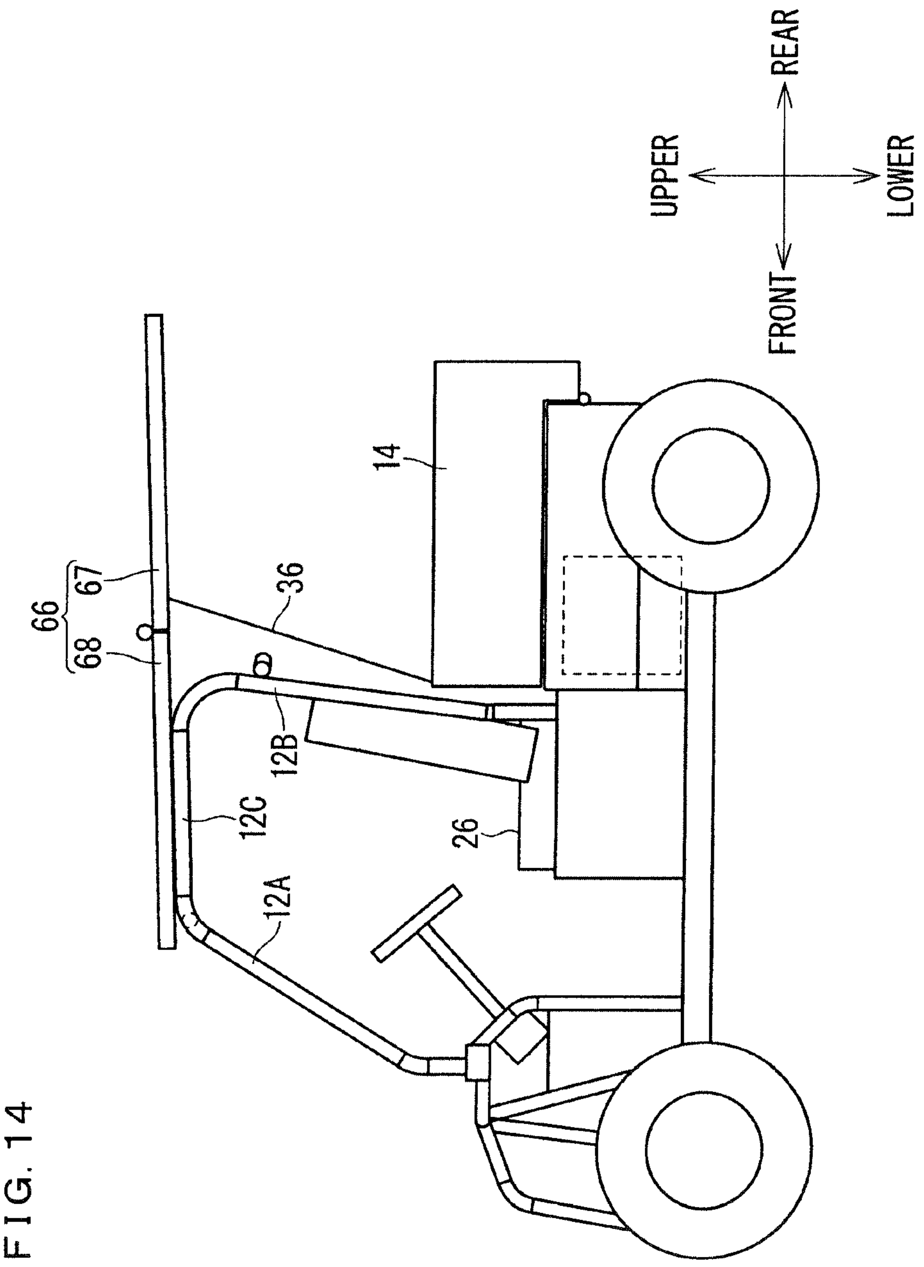
FIG. 14 is a side view illustrating a utility vehicle including a link.
Figure 15:
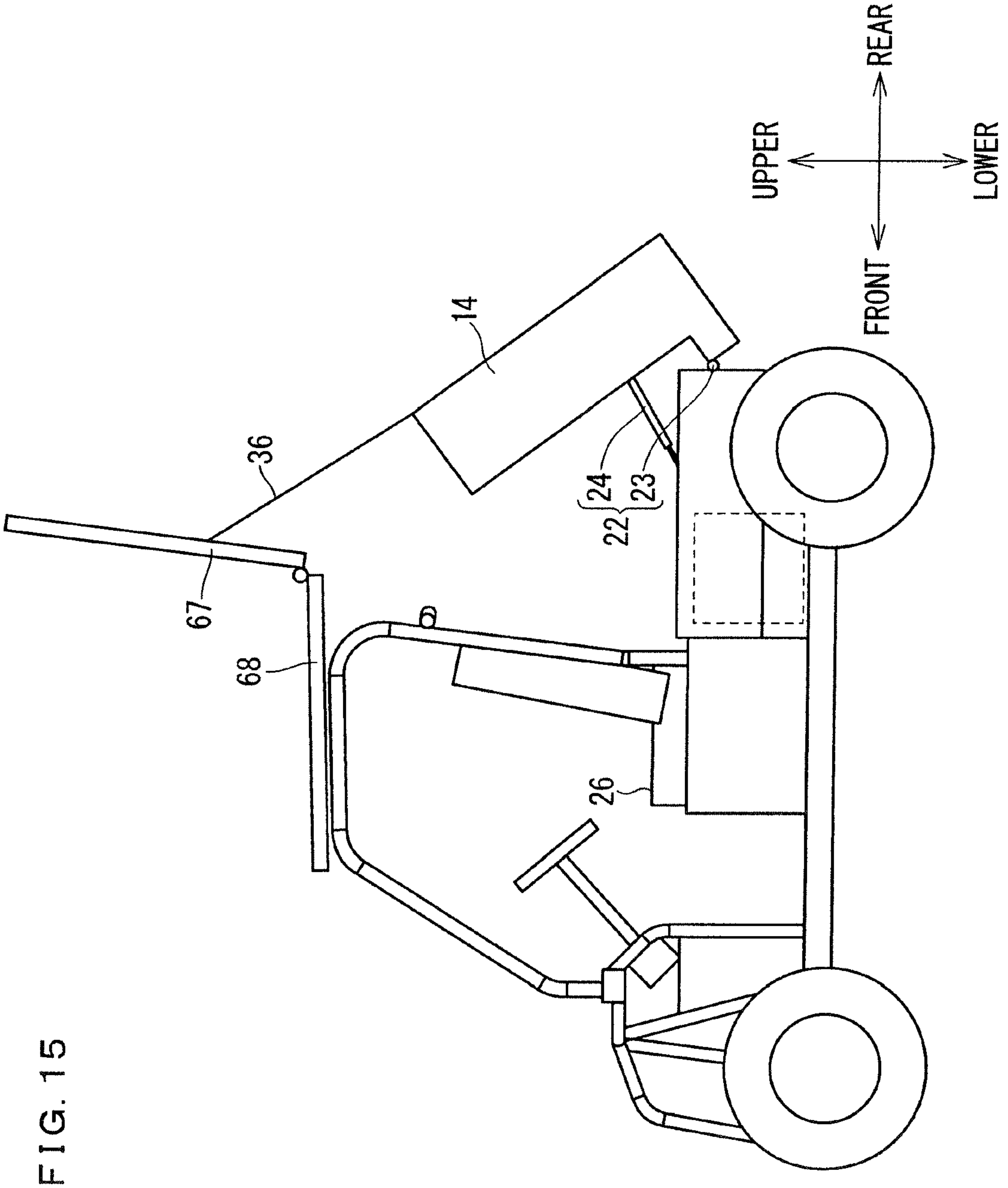
FIG. 15 is a side view illustrating the utility vehicle dumping a cargo bed.

FIG. 14 is a side view illustrating the utility vehicle 10 including a link 36. FIG. 15 is a side view illustrating the utility vehicle 10 dumping the cargo bed 14.

The utility vehicle 10 includes, in addition to the dumper 22, the link 36 that connects the cargo bed 14 and the roof 40. A roof 66 is in the first state when the cargo bed 14 is not tilted and is moved by the link 36 to be in the second state when the cargo bed 14 is tilted.

The roof 66 is an integrated roof that includes a hinged roof part 67 and a fixed roof part 68 provided integrally. The fixed roof part 68 covers the top of the riding space, and the hinged roof part 67 covers the top of the cargo bed 14. A front end of the hinged roof part 67 is connected to the fixed roof part 68 via a hinge. When the cargo bed 14 is tilted, the link 36 pushes the hinged roof part 67 to rotate the hinged roof part 67 around an axis along the left-right direction. The roof 66 may include a sliding roof part in place of the hinged roof part 67. When the cargo bed 14 is tilted, the link 36 may push the sliding roof part to move the sliding roof part in the front-rear direction so that the sliding roof part overlaps the fixed roof part 68.

Effects and Others

According to the utility vehicle 10 having a configuration as described above, the utility vehicle 10 can travel with the roof 40 being opened or closed as necessary.

In a case where the roof 40 is removable from the utility vehicle 10, and the second state is a state in which the roof 40 is removed as illustrated in FIG. 2, the utility vehicle 10 can travel with the roof 40 being removed.

In a case where the ROPS 12 includes the top part that covers the roof 42, and at least a portion of the roof 42 is openable and closable as illustrated in FIG. 4, the roof 42 can be opened and closed while the roof 42 is provided to a portion of the ROPS 12.

In a case where the state of the roof 42 is changeable between the first state and the second state with the roof 42 being attached to the utility vehicle 10 as illustrated in FIG. 4, the state of the roof 42 is changeable without removing the roof 42.

In a case where the state of the roof 42 is changeable between the first state and the second state during travel of the utility vehicle 10 in this case, the top of the first region can be opened and closed during travel as necessary.

As illustrated in FIG. 4, the roof 42 may include the hinged roof 45 that is supported rotatably, the first state may be the state in which the hinged roof 45 is located above the first region, and the second state may be the state in which the hinged roof 45 is located at the position offset from the first region. In this case, the state is easily changeable between the first state and the second state by rotating the hinged roof 45.

As illustrated in FIG. 5, the utility vehicle 10 may include the front cover 70 that covers the front of the riding space so that the front is openable and closable, and the top of the riding space may be covered with the roof 42 to be openable and closable. In this case, by opening both the front cover 70 and the roof 42, a travel wind entering through the opening of the front cover 70 can exit through the opening of the roof 42 to enhance a function to ventilate the riding space.

As illustrated in FIG. 5, the rear cover 72 that covers the rear of the riding space so that the rear is openable and closable may be included, and the top of the riding space may be covered with the roof 42 to be openable and closable. In this case, by opening both the rear cover 72 and the roof 42, a travel wind entering through the opening of the roof 42 can exit through the opening of the rear cover 72 to enhance the function to ventilate the riding space.

As illustrated in FIG. 6, the cover 50 that covers a periphery of the riding space and is removably provided to the ROPS 12 may be included, the roof 47 may cover the top of the riding space, and the cover 50 may include at least one selected from the group consisting of the front cover 50B that covers the front of the riding space, the rear cover 50E that covers the rear of the riding space, the left side cover 50C that covers the left side of the riding space, and the right side cover 50D that covers the right side of the riding space. In this case, at least one side of the periphery of the riding space can be covered with the cover 50.

As illustrated in FIG. 7, the roof may include the sliding roof 54 that is slidably supported, the first state may be the state in which the sliding roof 54 is located above the first region, and the second state may be the state in which the sliding roof 54 is located at the position offset from the top of the first region. In this case, the state is easily changeable between the first state and the second state by sliding the sliding roof 54.

In a case where the utility vehicle 10 includes the sliding assist member 55 that is attached to the ROPS 12 and slidably supports the sliding roof 54 as illustrated in FIG. 7, there is no need to provide a member that supports the sliding assist member 55 separately from the ROPS 12.

As illustrated in FIG. 10, the roof 62 may include the fixed roof part 64 that covers the top of the second region of the vehicle body, and at least a portion of the sliding roof part 63 may overlap the fixed roof part 64 in the second state. In this case, the sliding roof part 63 can be in a received state by causing the sliding roof part 63 to overlap the fixed roof part 64. The top of the first region can be opened and closed while a state of covering the second region with the fixed roof part 64 is maintained.

As illustrated in FIG. 10, the vehicle body may include the cargo bed 14 located rearward of the ROPS 12, the first region may be the region of the cargo bed 14, and the second region may be the region of the ROPS 12. In this case, cargo having a height is stackable when the sliding roof part 63 is slid to open the top of the cargo bed 14.

As illustrated in FIG. 11, the utility vehicle 10 may include the cover part 65 that is attached to the sliding roof part 63 to be expandable and receivable, and the cover part 65 may be expandable into the first region when the sliding roof part 63 is in the first state. In this case, the cover part 65 can cover the front, the sides, or the rear of the cargo bed 14.

In a case where the utility vehicle 10 includes the dumper 22 as in an example illustrated in FIG. 13, the mechanism to change the state of the roof 42 to the first state and the second state may be independent of the dumper 22. In this case, the roof 42 can be opened and closed separately from the dumping action.

As in an example illustrated in FIGS. 14 and 15, the roof 66 may be in the first state with the cargo bed 14 not being tilted and may be spaced from the cargo bed 14 by the link 36 to be in the second state when the cargo bed 14 is tilted. In this case, interference of the cargo bed 14 or cargo with the roof 66 when the cargo bed 14 is tilted can be suppressed.

Configurations described in the above-mentioned embodiment and modifications can be combined with each other as appropriate unless any contradiction occurs.

Appendices

The present application discloses the following aspects.

A first aspect is a utility vehicle comprising: a vehicle body that includes a rollover protective structure (ROPS) defining a riding space; and a roof that covers a top of the vehicle body, wherein a state of the roof is changeable to a first state in which a top of a first region of the vehicle body is covered and a second state in which the top of the first region of the vehicle body during travel is opened.

According to the utility vehicle, the utility vehicle can travel with the roof being opened or closed as necessary.

A second aspect is the utility vehicle according to the first aspect, wherein the ROPS includes a top part that covers the roof, and at least a portion of the roof is openable and closable. The roof can be opened and closed while the roof is provided to a portion of the ROPS.

A third aspect is the utility vehicle according to the first or the second aspect further comprising a front cover that covers a front of the riding space so that the front is openable and closable, wherein a top of the riding space is covered with the roof to be openable and closable. Thus, by opening both the front cover and the roof, a travel wind entering through an opening of the front cover can exit through an opening of the roof to enhance a function to ventilate the riding space.

A fourth aspect is the utility vehicle according to any one of the first to the third aspects further comprising a rear cover that covers a rear of the riding space so that the rear is openable and closable, wherein a top of the riding space is covered with the roof to be openable and closable. Thus, by opening both the rear cover and the roof, a travel wind entering through the opening of the roof can exit through an opening of the rear cover to enhance the function to ventilate the riding space.

A fifth aspect is the utility vehicle according to any one of the first to the fourth aspects, wherein the state of the roof is changeable between the first state and the second state during travel of the utility vehicle. The top of the first region can thus be opened and closed during travel as necessary.

A sixth aspect is the utility vehicle according to any one of the first to the fifth aspects, wherein the roof is removable from the utility vehicle, and the second state is a state in which the roof is removed. The utility vehicle can thus travel with the roof being removed.

A seventh aspect is the utility vehicle according to the first aspect, wherein the vehicle body includes a cargo bed that is located rearward of the ROPS, the utility vehicle further comprises: a chassis that supports the cargo bed; and a dumper that tilts the cargo bed relative to the chassis, and a mechanism to change the state of the roof to the first state and the second state is independent of the dumper. The roof can thus be opened and closed separately from the dumping action.

An eighth aspect is the utility vehicle according to the first aspect, wherein the state of the roof is changeable between the first state and the second state with the roof being attached to the utility vehicle. The state of the roof is thus changeable without removing the roof.

A ninth aspect is the utility vehicle according to the eighth aspect, wherein the roof includes a sliding roof that is supported slidably, the first state is a state in which the sliding roof is located above the first region, and the second state is a state in which the sliding roof is located at a position offset from the top of the first region. The state is thus easily changeable between the first state and the second state by sliding the sliding roof.

A tenth aspect is the utility vehicle according to the ninth aspect further comprising a sliding assist member that is attached to the ROPS and slidably supports the sliding roof. Thus, there is no need to provide a member that supports the sliding assist member separately from the ROPS.

An eleventh aspect is the utility vehicle according to the ninth or the tenth aspect, wherein the roof includes a fixed roof that covers a top of a second region of the vehicle body, and at least a portion of the sliding roof overlaps the fixed roof in the second state. The sliding roof can thus be in a received state by causing the sliding roof to overlap the fixed roof. The top of the first region can be opened and closed while a state of covering the second region with the fixed roof is maintained.

A twelfth aspect is the utility vehicle according to the eleventh aspect, wherein the vehicle body includes a cargo bed that is located rearward of the ROPS, the first region is a region of the cargo bed, and the second region is a region of the ROPS. Cargo having a height is thus stackable when the sliding roof is slid to open the top of the cargo bed.

A thirteenth aspect is the utility vehicle according to the twelfth aspect further comprising a cover that is attached to the sliding roof to be expandable and receivable, wherein the cover is expandable into the first region when the sliding roof is in the first state. The cover can thus cover the front, the sides, or the rear of the cargo bed.

A fourteenth aspect is the utility vehicle according to the eighth aspect, wherein the roof includes a hinged roof that is supported rotatably, the first state is a state in which the hinged roof is located above the first region, and the second state is a state in which the hinged roof is located at a position offset from the first region. The state is thus easily changeable between the first state and the second state by rotating the hinged roof.

A fifteenth aspect is the utility vehicle according to any one of the first to the fourteenth aspects further comprising a cover that covers a periphery of the riding space and is removably provided to the ROPS, wherein the roof covers a top of the riding space, and the cover includes at least one selected from the group consisting of a front cover that covers a front of the riding space, a rear cover that covers a rear of the riding space, a left side cover that covers a left side of the riding space, and a right side cover that covers a right side of the riding space. At least one side of the periphery of the riding space can thus be covered with the cover.

A sixteenth aspect is a utility vehicle comprising: a rollover protective structure (ROPS) that defines a riding space; a cargo bed that is located rearward of the ROPS; a chassis that supports the cargo bed; a dumper that tilts the cargo bed relative to the chassis; a roof whose state is changeable to a first state in which a top of the cargo bed is covered and a second state in which the roof is located at a position more offset from the top of the cargo bed than in the first state; and a link that connects the cargo bed and the roof. The roof is in the first state with the cargo bed not being tilted and is spaced from the cargo bed by the link to be in the second state when the cargo bed is tilted. According to the sixteenth aspect, interference of the cargo bed or cargo with the roof when the cargo bed is tilted can be suppressed.

A seventeenth aspect is a roof for a utility vehicle that includes a rollover protective structure (ROPS) defining a riding space, the roof comprising: a roof main body that covers a top or a rear of the riding space; and an attachment that is removably attached to the ROPS. According to the seventeenth aspect, the roof that covers the top or the rear of the riding space is easily retrofittable to the utility vehicle that includes the ROPS.

The foregoing description is in all aspects illustrative and not restrictive. It is therefore understood that numerous unillustrated modifications can be devised without departing from the scope of the invention.

What is claimed is:

1. A utility vehicle comprising:

a vehicle body that includes a rollover protective structure (ROPS) defining a riding space; and a roof that covers a top of the vehicle body, wherein a state of the roof is changeable to a first state in which a top of a first region of the vehicle body is covered and a second state in which the top of the first region of the vehicle body during travel is opened, wherein the ROPS includes a top part that the roof covers, at least a portion of the roof is openable and closable, the roof is removable from the utility vehicle, the second state includes a state in which the roof is removed and an opened state in which the roof is opened in an attached state, the first state includes a state in which the roof is closed in the attached state, the roof includes a frame-shaped portion and a movable roof portion that closes an opening of the frame-shaped portion, the frame-shaped portion surrounds the front, rear, left, and right sides of the movable roof portion, and the roof can be switched between the opened state and a closed state of the first state by opening and closing the movable roof portion relative to the frame-shaped portion.

2. The utility vehicle according to claim 1 further comprising a front cover that covers a front of the riding space so that the front is openable and closable, wherein a top of the riding space is covered with the roof to be openable and closable.

3. The utility vehicle according to claim 1 further comprising a rear cover that covers a rear of the riding space so that the rear is openable and closable, wherein a top of the riding space is covered with the roof to be openable and closable.

4. The utility vehicle according to claim 1, wherein the state of the roof is changeable between the first state and the second state during travel of the utility vehicle.

5. The utility vehicle according to claim 1, wherein the vehicle body includes a cargo bed that is located rearward of the ROPS, the utility vehicle further comprises:

a chassis that supports the cargo bed; and a dumper that tilts the cargo bed relative to the chassis, and a mechanism to change the state of the roof to the first state and the second state is independent of the dumper.

6. The utility vehicle according to claim 1, wherein the state of the roof is changeable between the first state and the second state with the roof being attached to the utility vehicle.

7. The utility vehicle according to claim 6, wherein the roof includes a hinged roof that is supported rotatably, the first state is a state in which the hinged roof is located above the first region, and the second state is a state in which the hinged roof is located at a position offset from the first region.

8. The utility vehicle according to claim 1 further comprising a cover that covers a periphery of the riding space and is removably provided to the ROPS, wherein the roof covers a top of the riding space, and the cover includes at least one selected from the group consisting of a front cover that covers a front of the riding space, a rear cover that covers a rear of the riding space, a left side cover that covers a left side of the riding space, and a right side cover that covers a right side of the riding space.

9. The utility vehicle according to claim 1, wherein the ROPS includes a pair of side ROPS positioned on both sides in the vehicle width direction, extending in the longitudinal direction, and at least a portion of the roof is supported by the side ROPS in both the first state and the opened state of the second state.

10. The utility vehicle according to claim 1, wherein the roof includes an attachment attached to an attachment receiver which is attached to the ROPS, and the attachment receiver surrounds the ROPS.

* * * * *